US012513649B2

(12) United States Patent
Vegesna et al.

(10) Patent No.: US 12,513,649 B2
(45) Date of Patent: Dec. 30, 2025

(54) NETWORK BASED LOCATION PERFORMANCE IMPROVEMENT USING DSDA

(71) Applicant: QUALCOMM Incorporated, San Diego, CA (US)

(72) Inventors: Santhosh Kumar Varma Vegesna, Hyderabad (IN); Snigdha Byreddy, Hyderabad (IN); Venkatarao Reddy Buddala, Hyderabad (IN); Prudhvi Kodumuri, Mahabubabad (IN); Keerthi Chowdary V, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 18/301,929

(22) Filed: Apr. 17, 2023

(65) Prior Publication Data

US 2024/0349225 A1 Oct. 17, 2024

(51) Int. Cl.
*H04W 64/00* (2009.01)
*G01S 19/07* (2010.01)
*G01S 19/46* (2010.01)
*H04W 88/06* (2009.01)

(52) U.S. Cl.
CPC .............. *H04W 64/00* (2013.01); *G01S 19/07* (2013.01); *G01S 19/46* (2013.01); *H04W 88/06* (2013.01)

(58) Field of Classification Search
CPC ....... H04W 64/00; H04W 88/06; G01S 19/07; G01S 19/46

USPC ........................................................ 455/456.1
See application file for complete search history.

(56) References Cited

U.S. PATENT DOCUMENTS

| | | | |
|---|---|---|---|
| 2014/0210662 A1* | 7/2014 | Hatami | G01S 19/48 |
| | | | 342/450 |
| 2014/0256283 A1 | 9/2014 | Lin et al. | |
| 2015/0312717 A1 | 10/2015 | Shih et al. | |
| 2017/0223313 A1 | 8/2017 | Chong et al. | |
| 2018/0206109 A1* | 7/2018 | Bitra | H04W 4/02 |
| 2021/0314901 A1 | 10/2021 | Issakov et al. | |
| 2021/0345219 A1 | 11/2021 | Watts, Jr. et al. | |
| 2021/0367736 A1* | 11/2021 | Manolakos | H04W 72/21 |

OTHER PUBLICATIONS

International Search Report and Written Opinion—PCT/US2024/017170—ISA/EPO—Jun. 13, 2024.

* cited by examiner

*Primary Examiner* — Michael R Neff
(74) *Attorney, Agent, or Firm* — Thien T. Nguyen

(57) ABSTRACT

Aspects presented herein may improve positioning performance and latency for UEs with dual subscriber identity module (SIM) dual active (DSDA) feature(s). In one aspect, a UE establishes a connection with a first network entity and a second network entity based on DSDA. The UE selects (1) the first network entity or the second network entity for downloading data associated with calculating a position of the UE based on at least one criteria, or (2) a fix for calculating the position of the UE based on a set of available cache-based fixes associated with the first network entity and the second network entity. The UE calculates the position of the UE based on the downloaded data or the selected fix.

30 Claims, 10 Drawing Sheets

NETWORK BASED LOCATION PERFORMANCE IMPROVEMENT USING DSDA

TECHNICAL FIELD

The present disclosure relates generally to communication systems, and more particularly, to a wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus (e.g., a user equipment (UE)) establishes a connection with a first network entity and a second network entity based on dual subscriber identity module (SIM) dual active (DSDA). The apparatus selects (1) the first network entity or the second network entity for downloading data associated with calculating a position of the UE based on at least one criteria, or (2) a fix for calculating the position of the UE based on a set of available cache-based fixes associated with the first network entity and the second network entity. The apparatus calculates the position of the UE based on the downloaded data or the selected fix.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
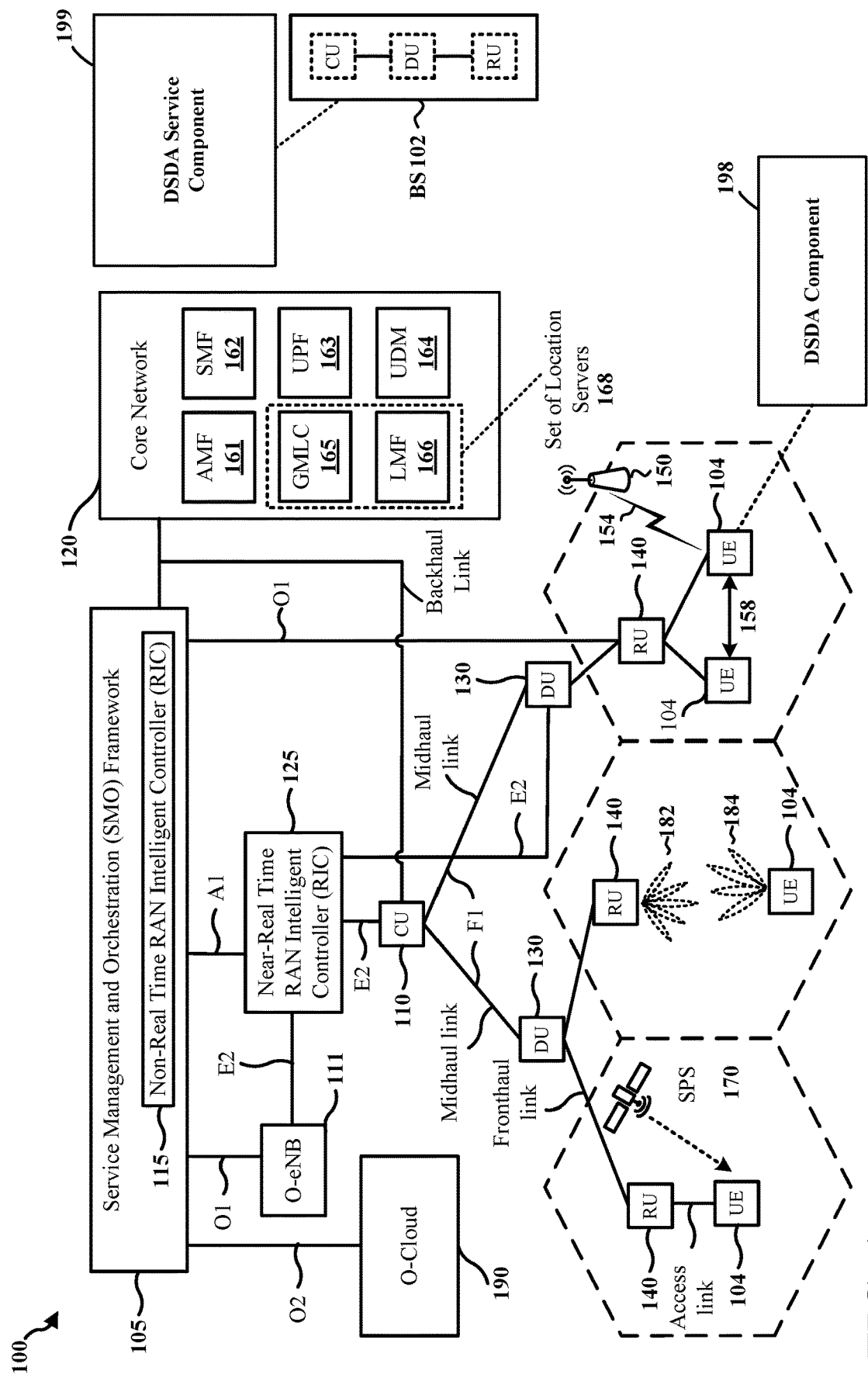
FIG. 1 is a diagram illustrating an example of a wireless communications system and an access network.

Aspects presented herein may improve positioning/location performance and latency for devices with dual subscriber identity module (SIM) dual active (DSDA) feature(s). Aspects presented herein may provide faster download and more precise positioning for devices performing assisted positioning, such as the assisted Global Positioning System (AGPS) positioning, and/or cell-ID based positioning. In one aspect of the present disclosure, a device (e.g., a UE or a positioning device supporting DSDA, etc.) may be configured to provide weightage to different networks/subs based on certain criteria such as network resources, and the device may download positioning related information (e.g., information associated with satellites, fixes, locations, etc.) using the network/sub with a higher weightage to achieve a faster downloading speed. In one example, the UE may provide the weightage for different networks/subs based on (1) reference signal received quality (RSRQ), exact signal strength, and/or signal to noise ratio (SNR), (2) real time transmission (Tx)/reception (Rx) speed from lower layers (e.g., data transmission speed), (3) cellular generation (e.g., 4G LTE, 5G NR, 6G, etc.), (4) channel load (cell load) or channel traffic, (5) clients bandwidth (e.g., applications occupancy upon each network/sub), or (6) a combination thereof. In another aspect of the present disclosure, a device (e.g., a UE or a positioning device supporting DSDA, etc.) may be configured to select a cell identification (ID) (to camp on) for positioning (e.g., terrestrial positioning, cell-ID based wireless wide area network (WWAN) positioning, network-based positioning, etc.) based on selecting a best or more suitable positioning fix that is derived from a set of cached information associated with multiple cell IDs.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-cNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth®, Wi-Fi® based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth® signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a DSDA component 198 that may be configured to establish a connection with a first network entity and a second network entity based on DSDA; select (1) the first network entity or the second network entity for downloading data associated with calculating a position of the UE based on at least one criteria, or (2) a fix for calculating the position of the UE based on a set of available cache-based fixes associated with the first network entity and the second network entity; and calculate the position of the UE based on the downloaded data or the selected fix. In certain aspects, the base station 102 may have a DSDA service component 199 that may be configured to provide DSDA services for devices/UEs with DSDA capabilities.

Figure 2:
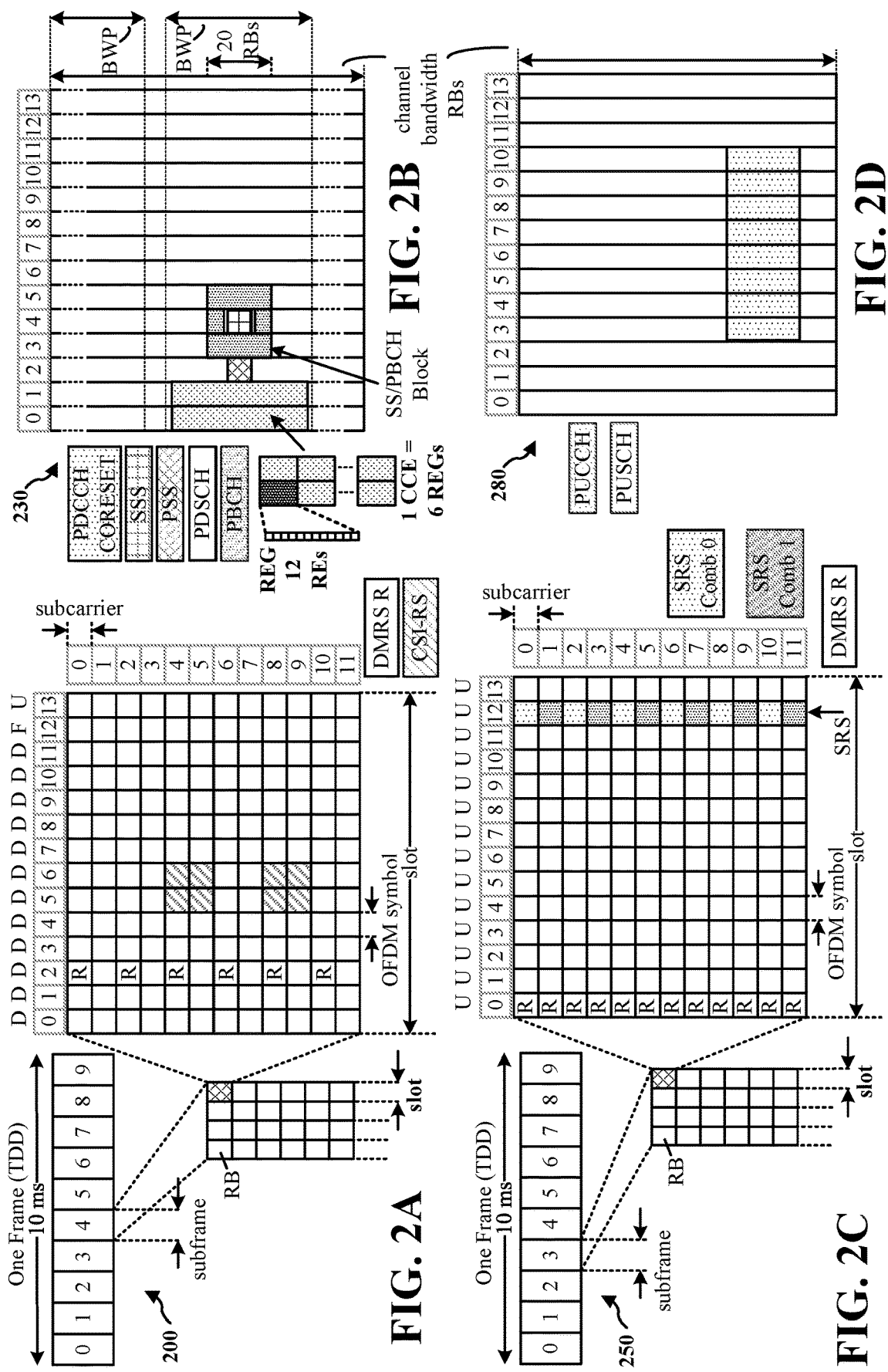
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
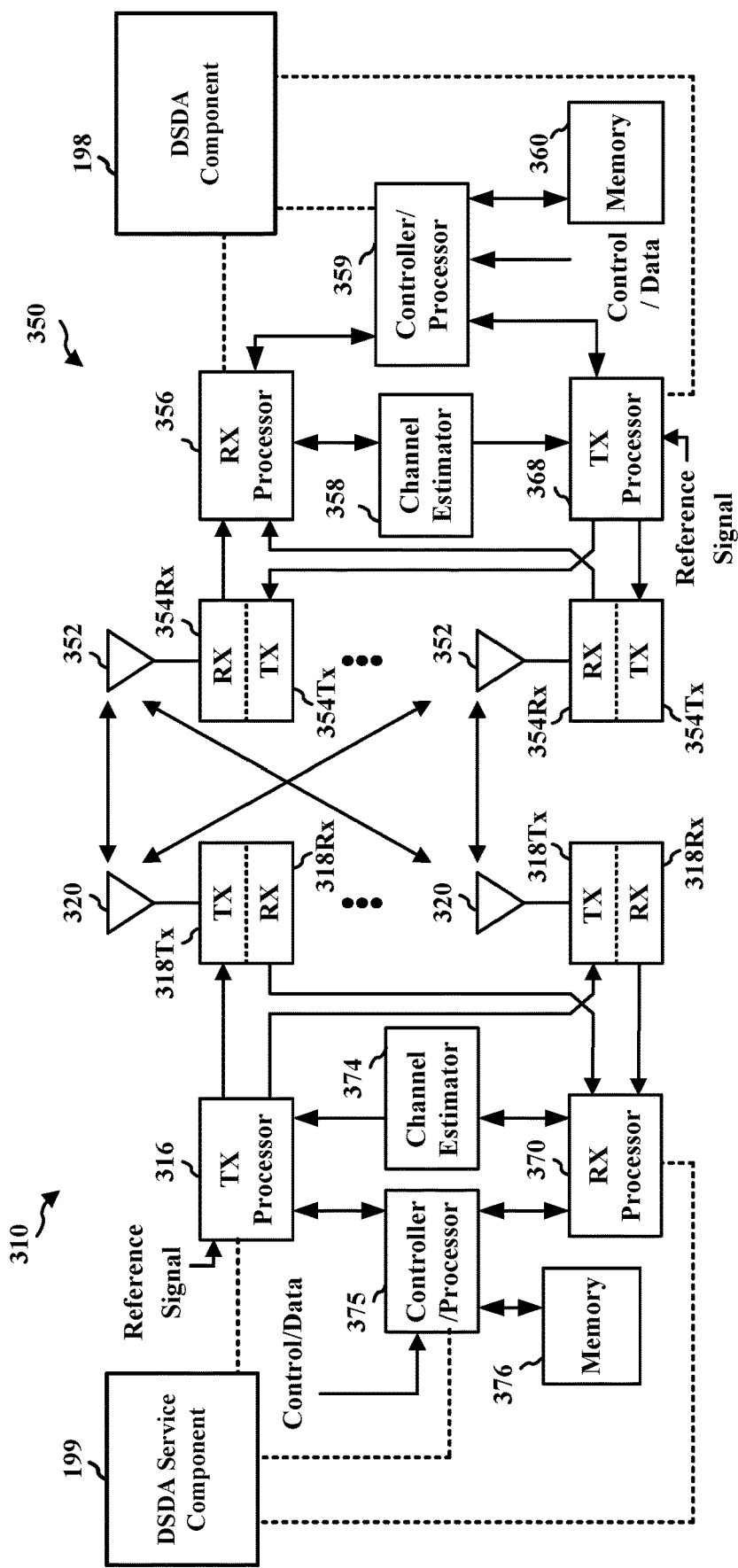
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency-domain, and then combined together using an Inverse Fast Fourier Transform (IFFT) to produce a physical channel carrying a time-domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency-domain using a Fast Fourier Transform (FFT). The frequency-domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the DSDA component 198 of FIG. 1.

At least one of the TX processor 316, the RX processor 370, and the controller/processor 375 may be configured to perform aspects in connection with the DSDA service component 199 of FIG. 1.

Figure 4:
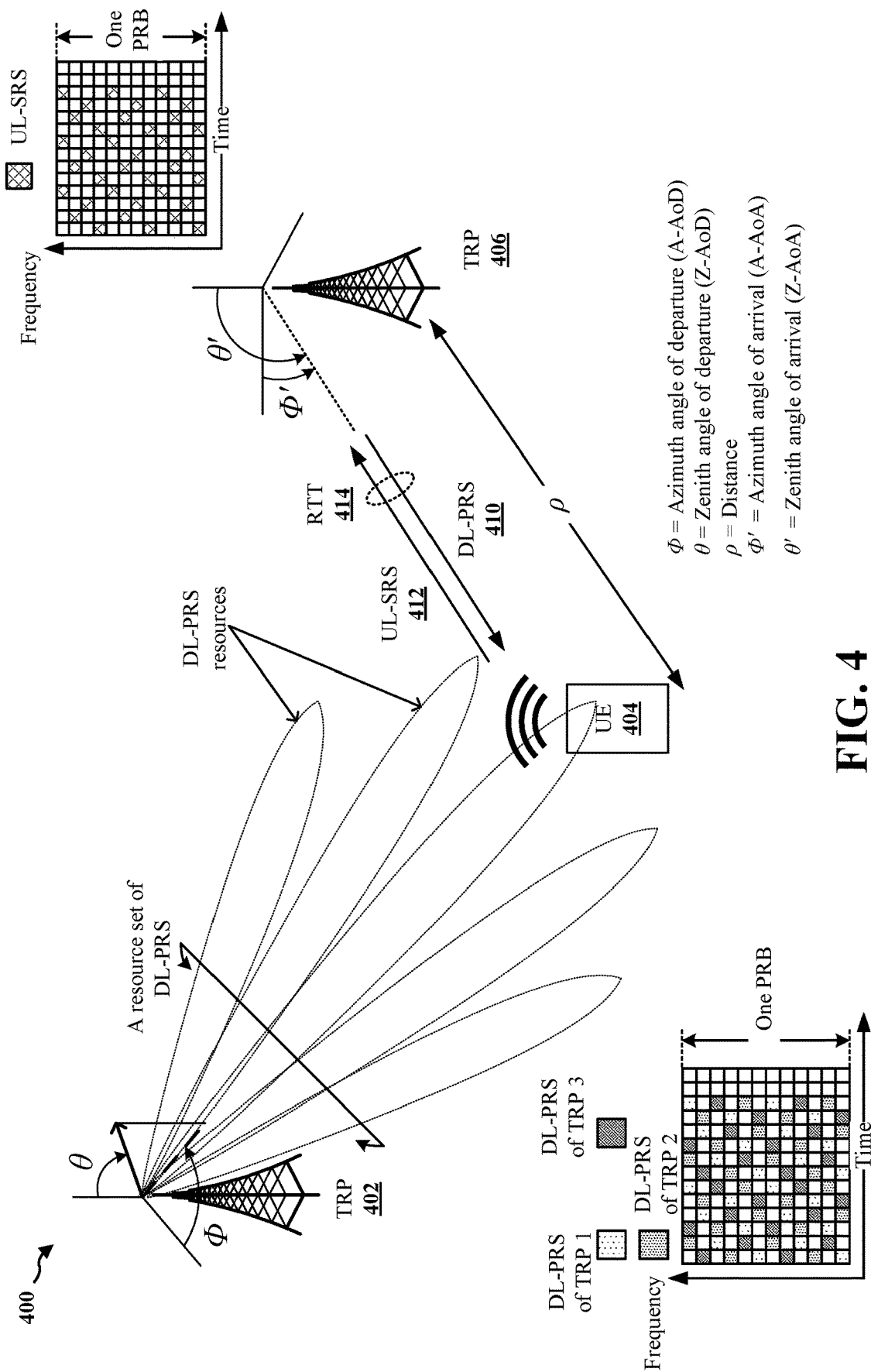
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX} - T_{PRS\_TX}\| - \|T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FRI and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS. SSS. SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS. PTRS), the signals may be prepended with "UL" or "DL" to distinguish the direction. For example, "UL-DMRS" may be differentiated from "DL-DMRS."

In recent days, a variety types of UEs (e.g., mobile phones) have the capability to support more than one subscriber identity modules (SIM) card (including embedded-SIM (eSIM)), such as two SIM cards. Many mobile carriers also have opted to provide supports for dual SIM dual active (DSDA), where a UE may connect to multiple mobile networks via their corresponding SIM cards, and the UE may be permitted to communicate using different/multiple subscriber accounts and/or networks at the same time. For example, each SIM card may be associated with a different subscriber account, a different network, and/or a radio access technology (RAT). For purposes of the present disclosure, a SIM/carrier, a subscriber account, a network, and/or a RAT that is associated with a SIM card or is able to be accessed by a SIM card may collectively be referred to as a "sub." In other words, a sub may refer to a SIM/carrier.

FIGS. 5A, 5B, 5C, and 5D are diagrams 500A, 500B, 500C, and 500D, respectively, illustrating examples of a UE communicating with two networks based on dual SIM dual active services in accordance with various aspects of the present disclosure. A UE 502 may have the capability to support dual/two SIM cards, where a first SIM card (SIM #1) enables the UE 502 to communicate with a first network 504 (e.g., a first sub operated by a first network carrier) and a second SIM card (SIM #2) enables the UE 502 to communicate with a second network 506 (e.g., a second sub operated by a second network carrier).

Figure 5:
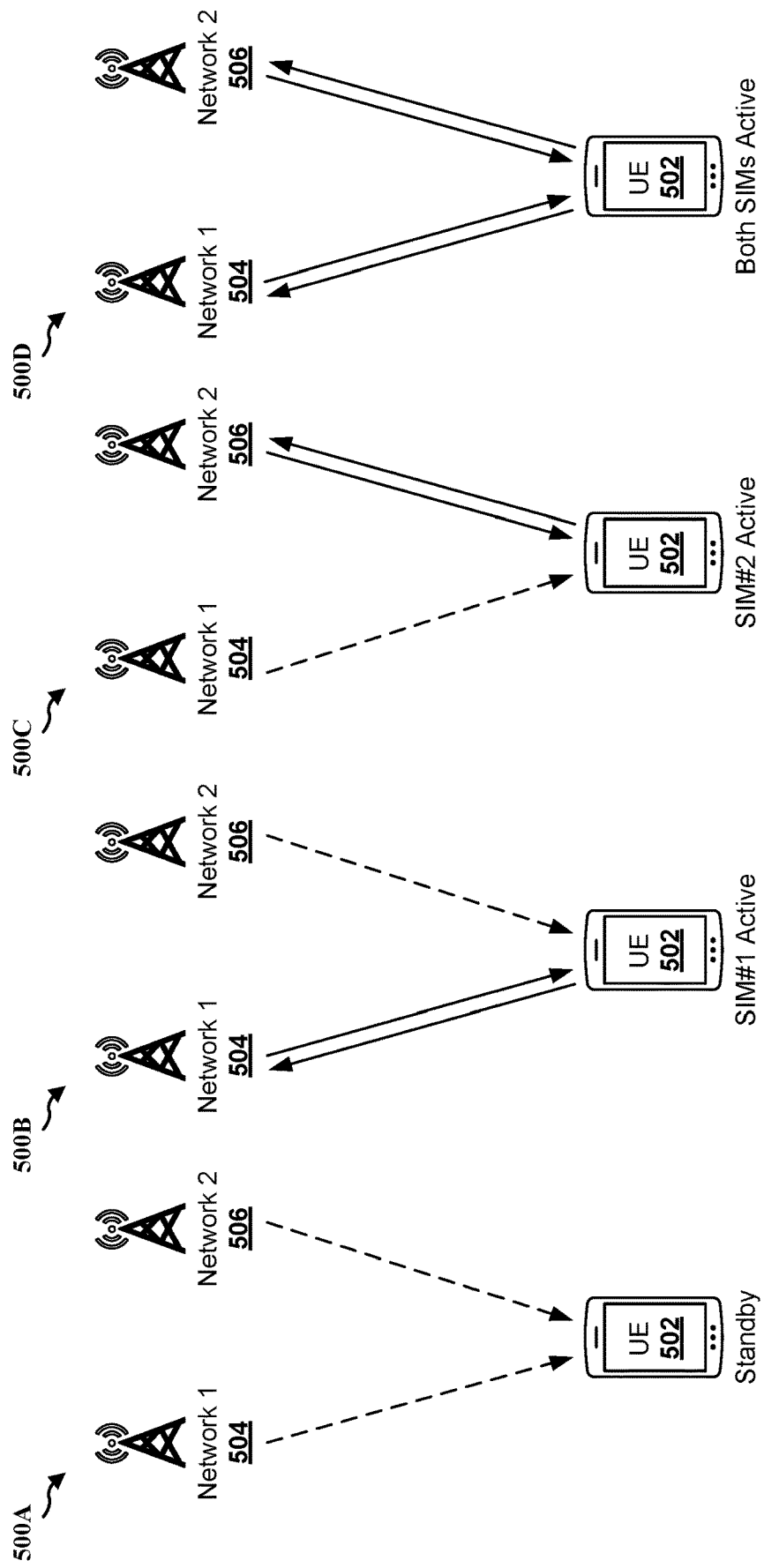
FIG. 5A is a diagram illustrating an example of a UE communicating with two networks based on dual subscriber identity module (SIM) dual active (DSDA) services in accordance with various aspects of the present disclosure.
FIG. 5B is a diagram illustrating an example of a UE communicating with two networks based on DSDA services in accordance with various aspects of the present disclosure.
FIG. 5C is a diagram illustrating an example of a UE communicating with two networks based on DSDA services in accordance with various aspects of the present disclosure.
FIG. 5D is a diagram illustrating an example of a UE communicating with two networks based on DSDA services in accordance with various aspects of the present disclosure.

As shown by the diagram 500A of FIG. 5A, when the UE 502 is under a standby mode, the UE 502 may monitor for communications from both the first network 504 and the second network 506. As shown by the diagram 500B of FIG. 5B, when the first SIM card of the UE 502 is active (and the second SIM card is in the standby mode), the UE 502 may communicate with the first network 504 using the first SIM card, and the UE 502 may also monitor for communications from the second network 506. Similarly, as shown by the diagram 500C of FIG. 5C, when the second SIM card of the UE 502 is active (and the first SIM card is in the standby mode), the UE 502 may communicate with the second network 506 using the second SIM card, and the UE 502 may also monitor for communications from the first network 504. As shown by the diagram 500D of FIG. 5D, when both the first SIM card and the second SIM card of the UE 502 are active, the UE 502 may communicate with both the first network 504 and the second network 506 at the same time using their respective SIM cards.

In some scenarios, certain applications running on a UE supporting dual SIM/DSDA may be configured to use data services based on first sub (sub0) and second sub (sub1) selections. In other words, these applications may be configured to choose either the first sub (associated with the first SIM) or the second sub (associated with the second SIM) for data services (e.g., transmitting data, receiving data, etc.). For example, applications such as assisted Global Positioning System (AGPS or A-GPS) technology, which may also be referred to as GPS assisted technology or GNSS assistance service, may not have the capability to choose a better/faster network among available networks for faster download and/or global navigation satellite system (GNSS) fix.

Global Positioning System (GPS) is a technology that enables a UE (e.g., a GPS device) to communicates with multiple (e.g., 4 or more) satellites to determine its exact location coordinates (e.g., latitude and longitude coordinates) on Earth. While AGPS may work on the same principles as the GPS, AGPS may also enable a UE to obtain information associated with the satellites by using network resources e.g., using a mobile network, which may also be referred to as assistant server(s). In some scenarios, AGPS may enable a UE to determine location coordinates faster because the UE may have a better connectivity with cell sites than directly with satellites. A GNSS fix (or a position fix) may be a term used in navigation to describe a position derived from measuring external reference points. For example, a fix may be where two position lines intersect.

In another example, for certain applications associated with terrestrial positioning (e.g., cell-ID based wireless wide area network (WWAN) positioning), when a UE camps on a current cell ID at the time of the contact to a positioning server (e.g., a cell-ID based WWAN positioning server) to get position related information, the UE may be specified to establishes a connection (e.g., a cell-ID based positioning connection) with the positioning server based on the current cell ID if position accuracy stored in device file system exceeds a threshold. In other words, the UE may be configured to use the current camped cell ID in a session (e.g., a cell-ID based positioning session) with a positioning server irrespective position accuracy stored in the UE file system, and/or the UE may be configured to establish the session with the positioning server on a current network/sub irrespective of its data link quality. For purposes of the present disclosure, when a UE camps on a cell or cell ID, it may refer to a procedure in which the UE searches for a suitable cell/cell ID of a selected public land mobile network (PLMN) (e.g., during/with cell/cell ID selection), and chooses that cell/cell ID to provide available services, and monitors its control channel. Cell-ID based positioning may refer to a localization technique where one or more base stations keep broadcasting its cell-ID messages to UEs within their signal range. In some examples, cell-ID based positioning may also include configuring a UE to download positioning fixes from a server (e.g., a location server) based on cell-ID.

Aspects presented herein may improve positioning performance and latency for devices with DSDA feature(s).

Aspects presented herein may provide faster download and more precise positioning for devices performing assisted positioning, such as the AGPS positioning, and/or cell-ID based positioning. In one aspect of the present disclosure, a device (e.g., a UE or a positioning device supporting DSDA, etc.) may be configured to provide weightage to different networks/subs based on certain criteria such as network resources, and the device may download positioning related information (e.g., information associated with satellites, fixes, locations, etc.) using the network/sub with a higher weightage to achieve a faster downloading speed. In one example, the UE may provide the weightage for different networks/subs based on (1) reference signal received quality (RSRQ), exact signal strength, and/or signal to noise ratio (SNR), (2) real time transmission (Tx)/reception (Rx) speed from lower layers (e.g., data transmission speed), (3) cellular generation (e.g., 4G LTE, 5G NR, 6G, etc.), (4) channel load (cell load) or channel traffic. (5) clients bandwidth (e.g., applications occupancy upon each network/sub), or (6) a combination thereof. In another aspect of the present disclosure, a device (e.g., a UE or a positioning device supporting DSDA, etc.) may be configured to select a cell ID (to camp on) for positioning (e.g., terrestrial positioning, cell-ID based WWAN positioning, network-based positioning, etc.) based on selecting a best or more suitable positioning fix that is derived from a set of cached information associated with multiple cell IDs.

Figure 6:
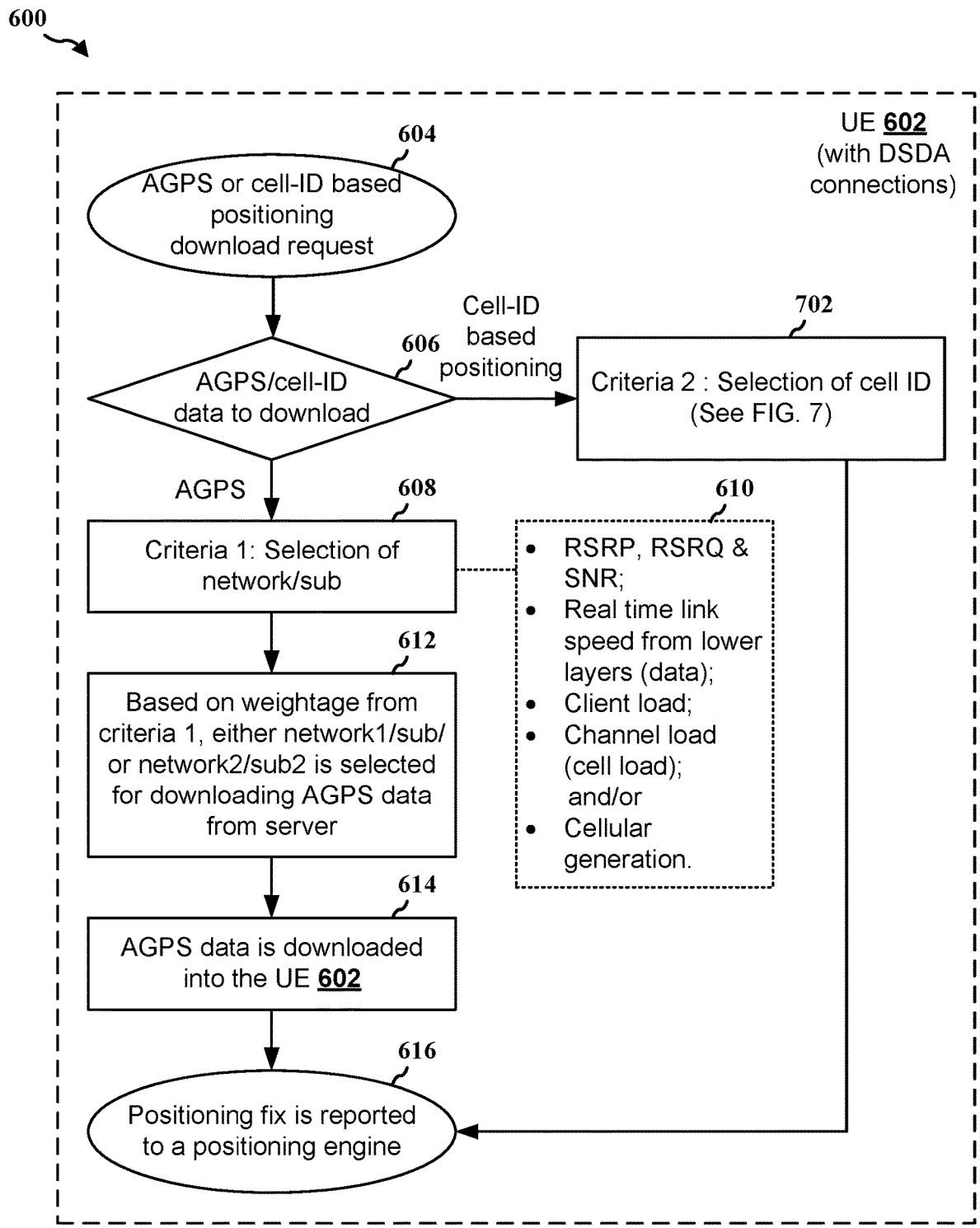
FIG. 6 is a flowchart illustrating an example of configuring a UE (e.g., a positioning device) with DSDA capabilities to select a network/sub for communicating positioning related information in accordance with various aspects of the present disclosure.

FIG. 6 is a flowchart 600 illustrating an example of configuring a UE (e.g., a positioning device) with DSDA capabilities to select a network/sub for communicating (e.g., downloading) positioning related information in accordance with various aspects of the present disclosure. Aspects presented herein may improve positioning performance and latency by enabling a UE with DSDA capabilities to select a network/sub most suitable for assisted positioning (e.g., AGPS positioning, GNSS assistance services, etc.) and/or cell-ID based positioning (e.g., network-based positioning. WWAN positioning. Wi-Fi positioning, etc.) based on one or more criteria.

As described in connection with FIGS. 5A to 5D, a UE 602 may include DSDA capabilities, where the UE 602 may communicate with (and/or monitor communication from) at least a first network/sub (e.g., via a first SIM) and a second network/sub (e.g., via a second SIM) at the same time.

At 604, the UE 602 may receive a AGPS or cell-ID based positioning download request, such as from an application running on the UE 602 that specifies AGPS or cell-ID based positioning or related services (e.g., a navigation application, a mapping application, etc.). As described above, GPS may provide means to determine position, velocity, and time around the globe. Each satellite's signal may be modulated by a navigation message that includes accurate time and coefficients (ephemeris) to an equation that describes the satellite's position as a function of time. The receiver (e.g., the UE 602) position determination may be based on time of arrival (TOA). The four main general GPS receiver functions may include: (1) measuring distance from the satellites to the receiver by determining the pseudo-ranges (code phases), (2) extracting the TOA of the signal from the contents of the satellite transmitted message, (3) computing the position of the satellites by evaluating the ephemeris data at the indicated TOA, and (4) calculating the position of the receiving antenna and the clock bias of the receiver by using the above data items.

Certain position errors at the receiver may be contributed by the satellite clock, satellite orbit, ephemeris prediction, ionospheric delay, and/or tropospheric delay, etc. To reduce these errors, range and range-rate corrections may be applied to the raw pseudo-range measurements in order to create a position solution that is accurate to a few meters in open environments. One correction technique is differential GPS (DGPS), which uses a reference receiver at a surveyed position to send correcting information to a mobile receiver over a communications link.

AGPS positioning method may improve the performance of GPS positioning as GPS positioning may suffer from certain drawbacks. For example, the startup time of GPS positioning (e.g., from turning on the receiver to the initial position fix) may be relatively long due to the long acquisition time of the navigation message (e.g., 30 seconds to a few minutes). GPS devices may not be able to detect weak signals that result from indoor and urban environment (or lower antenna capabilities). The power dissipation for GPS positioning may be relatively high per fix, which may due to the long signal acquisition time in an unaided application. Thus, the concept of AGPS is to establish a GPS reference network (or a wide-area DGPS network) whose receivers may have clear views of the sky and that can operate continuously. This reference network may also be connected with the cellular infrastructure, continuously monitors the real-time constellation status, and provides data such as approximate handset position (or base station location), satellite visibility, ephemeris and clock correction, Doppler, and even the pseudorandom noise code phase for each satellite at a particular epoch time. At the request of a UE or location-based application, the assist data derived from the GPS reference network are transmitted to the UE GPS receiver (or sensor) to aid fast startup and increase sensor sensitivity. Thus, acquisition time may be reduced because the Doppler and/or code phase uncertainty space may be much smaller than in the GPS positioning as such search space has been predicted by the reference receiver and network. This allows for rapid search speed and a much narrower signal search bandwidth, which may enhance sensitivity and reduce UE power consumption.

At 606, based on the AGPS/cell-ID based positioning download request, the UE 602 may determine whether AGPS data or cell-ID data is to be downloaded. For example, if the UE 602 receives an AGPS download request and the UE 602 already has the latest AGPS data, the UE 602 may determine that no AGPS data is to be downloaded (e.g., from a corresponding server). On the other hand, if the UE 602 does not have the AGPS data or the AGPS data is not up-to-date, then the UE 602 may determine that AGPS data is to be downloaded. If the UE 602 is specified to download the AGPS data, the UE 602 may be configured to perform a first criteria that is associated with selection of network/sub (e.g., described in connection with 608 below). On the other hand, if the UE 602 is specified to download the cell-ID data, the UE 602 may be configured to perform a second criteria that is associated with selection of cell ID (e.g., described in connection with FIG. 7 below).

At 608, if the UE 602 is specified to download the AGPS data, the UE 602 may be configured to select one of the networks/subs for downloading the AGPS data (e.g., either from the first network/sub or the second network/sub). In one aspect of the present disclosure, to determine which network/sub to select for downloading the AGPS data, the UE 602 may be configured to compute a weight for each network/sub based on one or more parameters.

As shown at 610, in one example, the one or more parameters may include reference signal received power (RSRP) (e.g., current RSRP in dBm as measured by layer 1 (L1), which may range from −80 dBm to −100 dBm), reference signal received quality (RSRQ) (e.g., RSRQ value in dB (signed integer value) as measured by L1), exact signal strength, and/or signal to noise ratio (SNR) (e.g., SNR level as a scaled integer in units of 0.1 dB) between the UE 602 and each network/sub. In some examples, the UE 602 may also be able to query signal strength from the corresponding network or network access service (NAS) (e.g., using a NAS_GET_SIG_INFO message) and receive the RSRP, RSRQ, and/or SNR values from the network or NAS. In another example, the one or more parameters may include real time transmission (Tx)/reception (Rx) speed from lower layers (e.g., data transmission speed) between the UE 602 and each network/sub. For example, the UE 602 may obtain real time link speed by querying lower layers. In another example, the one or more parameters may include cellular generation associated with the networks/subs (e.g., 4G LTE, 5G NR, 6G, etc.), where the UE 602 may compare modem cellular generations. In another example, the one or more parameters may include channel load (cell load) or channel traffic between the UE 602 and each network/sub. For example, the UE 602 may query cell load from a corresponding network using/passing an application programming interface (API). In another example, the one or more parameters may include client(s) load/bandwidth (e.g., applications occupancy upon each network/sub), etc., which may be available to the UE 602 by obtaining/knowing applications occupancy upon each network/sub.

Based on the one or more parameters, the UE 602 may compute weightage for each network/sub. For example, a network/sub with a better RSRP, RSRQ, and/or SNR may be assigned with a higher weight compared to a network/sub with a lower RSRP, RSRQ, and/or SNR. Similarly, a network/sub with a faster link speed, less client/channel load, and/or newer cellular generation may be assigned with a higher weight compared to a network/sub with a slower link speed, heavier client/channel load, and/or older cellular generation (e.g., 5G may be assigned with a higher weight compared to 4G).

At 612, based on the calculated weight for each network/sub, the UE 602 may select one of the networks/subs for downloading the AGPS data from the server. For example, if the first network/sub has a higher weight compared to the second network/sub as the first network/sub may have a better RSRP/RSRQ/SNR, link speed, lower client/channel load, and/or newer cellular generation, then the UE 602 may select the first network/sub for downloading the AGPS data. On the other hand, if the second network/sub has a higher weight compared to the first network/sub, then the UE 602 may select the second network/sub for downloading the AGPS data. If both networks/subs have the same weight, the UE 602 may use either networks/subs for downloading the AGPS data.

At 614, after determining which network/sub to use for downloading the AGPS data, the UE 602 may download the AGPS data using the corresponding network/sub. In one example, the AGPS data (or data associated with calculating the position of the UE 602 or deriving a positioning fix) may include: Coordinated Universal Time (UTC), ionospheric (IONO) information, health information, and/or satellite information for one or more satellites. The satellite information for the one or more satellites may include: ephemeris of each satellite in the one or more satellites, almanac of each satellite in the one or more satellites, radial coefficients of each satellite in the one or more satellites, cross track coefficients of each satellite in the one or more satellites, along track coefficients of each satellite in the one or more satellites, and/or clock bias coefficients of each satellite in the one or more satellites, etc.

Then, at 616, based on the AGPS data, the UE 602 may derive a positioning fix, and the UE 602 may provide the derived positioning fix to a positioning engine (e.g., a location engine, or a GNSS engine) that may be configured to determine the position of the UE 602. Then, the positioning engine may provide the estimated position of the UE 602 to the application that sends the AGPS download request at 604. For purposes of the present disclosure, a positioning engine (PE) may refer to a software or an application that accepts positioning related measurements from GNSS chipsets and/or sensors to estimate position, velocity, and/or altitude of a UE (e.g., the UE 602).

Figure 7:
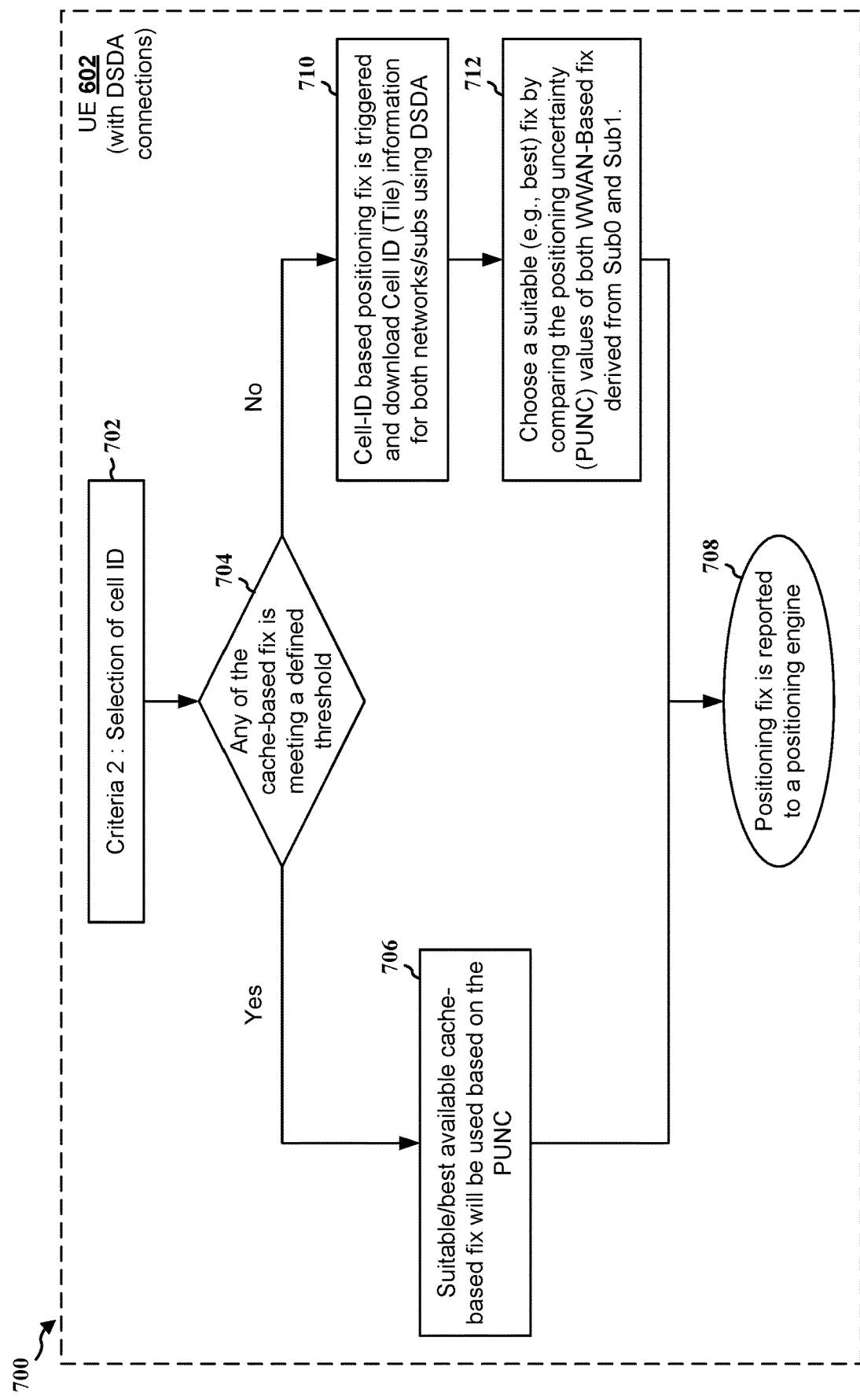
FIG. 7 is a flowchart illustrating an example of configuring a UE (e.g., a positioning device) with DSDA capabilities to select a network/sub for communicating positioning related information in accordance with various aspects of the present disclosure.

FIG. 7 is a flowchart 700 illustrating an example of configuring a UE (e.g., a positioning device) with DSDA capabilities to select a network/sub for communicating (e.g., downloading) positioning related information in accordance with various aspects of the present disclosure.

At 702, as discussed in connection with 606 of FIG. 6, if the UE 602 is specified to download the cell-ID data, the UE 602 may be configured to perform a second criteria that is associated with selection of cell or cell ID. As described above, cell-ID based positioning or cell-ID based WWAN positioning may refer to positioning that specifies downloading fixes from a server based on cell-ID to assist a UE with positioning.

At 704, in selecting a cell or cell ID, the UE 602 may check whether any fix(es) associated with the cell/cell ID of the first network/sub and/or the second network sub exceeds a predefined threshold (e.g., an accuracy threshold). In some examples, these fixes may be stored in the UE 602's non-volatile file system (e.g., from prior positioning sessions or downloads), and they may be referred to as "cache-based fix(es)."

For example, the UE 602 may have received and stored a first cache-based fix that is associated with the cell/cell ID of the first network/sub (e.g., obtained while the UE 602 camps on that cell/cell ID), and the UE 602 may have also received and stored a second cache-based fix that is associated with the cell/cell ID of the second network/sub (e.g., obtained while the UE 602 camps on that cell/cell ID), etc. Then, the UE 602 may determine or verify whether any of the first cache-based fix or the second cache-based fix exceeds a pre-defined accuracy threshold. For example, the UE 602 may check whether horizontal estimated position error (HEPE) value and/or positioning uncertainty (PUNC) value of the first cache-based fix and the second cache-based fix exceeds a HEPE/PUNC threshold.

At 706, if there is at least one cache-based fix exceeds the predefined accuracy threshold (e.g., the HEPE/PUNC threshold), then the UE 602 may select a cache-based fix from the at least one cache-based fix as the fix for positioning (e.g., as the positioning fix). In one example, if there are multiple cache-based fix exceeding the predefined accuracy threshold, the UE 602 may be configured to select a cache-based fix with the best HEPE/PUNC value (e.g., with the lowest HEPE/PUNC value). In other words, the UE 602 may check the best HEPE/PUNC value among the two cache fixes (network 1/sub 1 and network 2/sub 2) stored in the non-volatile file system of the UE 602, and best subcarrier cache-based fix will be used based on the PUNC/HEPE value if both cache-based fixes meet the threshold criteria. On the other hand, if there is just one cache-based fix that exceeds the predefined accuracy threshold, then the UE 602 may just use that cache-based fix as the positioning fix.

At 708, after the UE 602 selects a cache-based fix that can be used as the positioning fix, the UE 602 may provide this positioning fix to a positioning engine (e.g., a location engine, or a GNSS engine) that may be configured to determine the position of the UE 602. Then, the positioning engine may provide the estimated position of the UE 602 to the application that sends the cell-ID based positioning download request (e.g., as discussed in connection with 604 of FIG. 6).

On the other hand, if none of the cache-based fixes exceeds the predefined accuracy threshold, at 710, the UE 602 may be configured to download fixes (which may be referred to as cell-ID-based fixes and/or WWAN-based fixes) and cell ID (tile) information for both networks/subs based on DSDA. For example, based on the current cell ID on which the UE 602 is camped, cell ID (tile) information may be downloaded into the UE 602, where cell ID (tile) information may contain cell ID (e.g., mobile country code (MCC), mobile network code (MNC), tracking area code (TAC), network mode, etc.) and its associated positioning information (e.g., latitude and longitude coordinates).

At 712, after obtaining fixes and cell ID (tile) information for both networks/subs based on DSDA, the UE 602 may choose a most suitable or a best fix among the fixes as the positioning fix (e.g., for performing positioning), such as by comparing the HEPE/PUNC values of both fixes derived from the first network/sub and the second network/sub. Similarly, at 708, after the UE 602 selects a fix that can be used as the positioning fix, the UE 602 may provide this positioning fix to the positioning engine that may be configured to determine the position of the UE 602. Then, the positioning engine may provide the estimated position of the UE 602 to the application that sends the cell-ID based positioning download request (e.g., as discussed in connection with 604 of FIG. 6).

As described in connection with FIGS. 7 and 8, for AGPS data download, criteria 1 may be considered, and for cell-ID data download (e.g., cell partition download), criteria 2 may be considered. Consider a scenario where the first network/sub is faster than the second network/sub. When the modem of the UE 602 is in the DSDA mode, a AGPS/cell-ID based positioning client may be configured to access network resources and is specified to select among the first network/sub and the second network/sub. Based on aspects described in connection with FIGS. 7 and 8, the modem may first check for criteria 1 and/or 2 before choosing either of the networks/subs. Then, based on the weightage as per criteria 1 and/or 2, the modem may select the best or the most suitable network/sub (e.g., the first network/sub) for better service delivery and end-user experience. As such, the location positioning performance (faster download for AGPS/cell-ID data) may be improved with the algorithm described herein.

Figure 8:
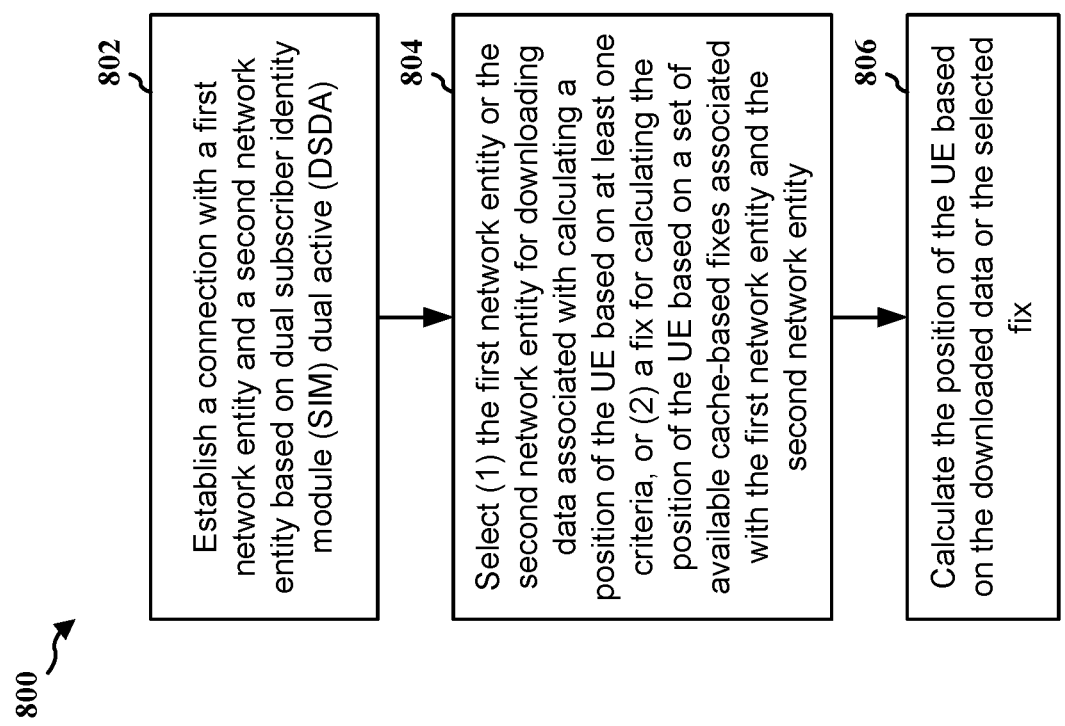
FIG. 8 is a flowchart of a method of wireless communication.

FIG. 8 is a flowchart 800 of a method of wireless communication. The method may be performed by a UE (e.g., the UE 104, 404, 502, 602; the apparatus 1004). The method may enable the UE to improve positioning performance and latency based on DSDA feature(s).

At 802, the UE may establish a connection with a first network entity and a second network entity based on DSDA, such as described in connection with FIGS. 5A, 5B, 5C, and 5D, 6 and 7. For example, as discussed in connection with FIG. 6, the UE 602 may include DSDA capabilities, where the UE 602 may communicate with (and/or monitor communication from) at least a first network/sub (e.g., via a first SIM) and a second network/sub (e.g., via a second SIM) at the same time. The establishment of the connection may be performed by, e.g., the DSDA component 198, the application processor 1006, the cellular baseband processor 1024, and/or the transceiver(s) 1022 of the apparatus 1004 in FIG. 10.

At 804, the UE may select (1) the first network entity or the second network entity for downloading data associated with calculating a position of the UE based on at least one criteria, or (2) a fix for calculating the position of the UE based on a set of available cache-based fixes associated with the first network entity and the second network entity, such as described in connection with FIGS. 6 and 7. For example, at 612 of FIG. 6, the UE 602 may select a network/sub from a plurality of networks/subs for downloading AGPS data based on calculating weightage for the plurality of networks/subs using one or more criteria (e.g., as shown at 610), which may be used for calculating the position of the UE 602. At 706 or 712 of FIG. 7, the UE 602 may also select a best/suitable fix for positioning by comparing the HEPE/PUNC values for a set of fixes. The selection may be performed by, e.g., the DSDA component 198, the application processor 1006, the cellular baseband processor 1024, and/or the transceiver(s) 1022 of the apparatus 1004 in FIG. 10.

In one example, the at least one criteria may include at least one of: a reference signal received power (RSRP), a reference signal received quality (RSRQ), a signal-to-noise-ratio (SNR), a data transmission speed, types of cellular network, an application occupancy, a load of a channel or a cell, or an available bandwidth.

In another example, the data associated with calculating the position of the UE includes at least one of: Coordinated Universal Time (UTC), ionospheric (IONO) information, health information, or satellite information for one or more satellites. In some implementations, the satellite information for the one or more satellites may include at least one of: ephemeris of each satellite in the one or more satellites, almanac of each satellite in the one or more satellites, radial coefficients of each satellite in the one or more satellites, cross track coefficients of each satellite in the one or more satellites, along track coefficients of each satellite in the one or more satellites, or clock bias coefficients of each satellite in the one or more satellites.

At 806, the UE may calculate the position of the UE based on the downloaded data or the selected fix, such as described in connection with FIGS. 6 and 7. For example, at 616 of FIG. 6, based on the AGPS data, the UE 602 may derive a positioning fix, and the UE 602 may provide the derived the derived positioning fix to a positioning engine (e.g., a location engine, or a GNSS engine) that may be configured to determine the position of the UE 602. The calculation of the position of the UE may be performed by, e.g., the DSDA component 198, the application processor 1006, the cellular baseband processor 1024, and/or the transceiver(s) 1022 of the apparatus 1004 in FIG. 10.

In one example, if the UE selects the first network entity or the second network entity for downloading the data associated with calculating the position of the UE based on the at least one criteria, the UE may compute a weight for each of the first network entity and the second network entity based on the at least one criteria; and select the first network entity or the second network entity for downloading the data associated with calculating the position of the UE based on the first network entity or the second network entity having a highest computed weight, such as described in connection with FIG. 6. For example, at 608, if the UE 602 is specified to download the AGPS data, the UE 602 may be configured to select one of the networks/subs for downloading the AGPS data (e.g., either from the first network/sub or the second network/sub). In one aspect of the present disclosure, to determine which network/sub to select for downloading the AGPS data, the UE 602 may be configured to compute a weight for each network/sub based on one or more parameters. The computation of the weight and the selection of the first network entity or the second network entity for downloading the data may be performed by, e.g., the DSDA component 198, the application processor 1006, the cellular baseband processor 1024, and/or the transceiver(s) 1022 of the apparatus 1004 in FIG. 10. In some implementations, to calculate the position of the UE based on the downloaded data, the UE may derive a second fix based on the downloaded data, and calculate the position of the UE based on the second fix. In some implementations, the calculation of the position of the UE is associated with assisted Global Positioning System (AGPS) service or global navigation satellite system (GNSS) assistance service.

In another example, if the UE selects the fix for calculating the position of the UE based on the set of available cache-based fixes associated with the first network entity and the second network entity, the UE may determine that a horizontal estimated position error (HEPE) or a positioning uncertainty (PUNC) for at least one cache-based fix in the set of available cache-based fixes meets an accuracy threshold, where the selected fix may correspond to a cache-based fix in the at least one cache-based fix having a lowest HEPE or a lowest PUNC, such as described in connection with FIG. 7. For example, at 706, if there is at least one cache-based fix exceeds the predefined accuracy threshold (e.g., the HEPE/PUNC threshold), then the UE 602 may select a cache-based fix from the at least one cache-based fix as the fix for positioning (e.g., as the positioning fix). In one example, if there are multiple cache-based fix exceeding the predefined accuracy threshold, the UE 602 may be configured to select a cache-based fix with the best HEPE/PUNC value. The determination of the HEPE or PUNC for at least one cache-based fix may be performed by, e.g., the DSDA component 198, the application processor 1006, the cellular baseband processor 1024, and/or the transceiver(s) 1022 of the apparatus 1004 in FIG. 10.

In another example, if the UE selects the fix for calculating the position of the UE based on the set of available cache-based fixes associated with the first network entity and the second network entity, the UE may determine that a HEPE or a PUNC for each cache-based fix in the set of cache-based fixes does not meet an accuracy threshold, obtain a first cell identification (ID) information from the first network entity and a second cell ID information from the second network entity, and derive a first fix associated with the first network entity based on the first cell ID information and a second fix associated with the second network entity based on the second cell ID information, where the selected fix corresponds to the first fix or the second fix that has a lowest HEPE or a lowest PUNC, such as described in connection with FIG. 7. For example, if none of the cache-based fixes exceeds the predefined accuracy threshold, at 710, the UE 602 may be configured to download fixes and cell ID (tile) information for both networks/subs based on DSDA. At 712, after obtaining fixes and cell ID (tile) information for both networks/subs based on DSDA, the UE 602 may choose a most suitable or a best fix among the fixes as the positioning fix (e.g., for performing positioning), such as by comparing the HEPE/PUNC values of both fixes derived from the first network/sub and the second network/sub. Similarly, at 708, after the UE 602 selects a fix that can be used as the positioning fix, the UE 602 may provide this positioning fix to the positioning engine that may be configured to determine the position of the UE 602. The determination of the HEPE or PUNC for each cache-based fix, the obtaining of the first cell ID information and the second cell ID information, and/or the derivation of the first fix and the second fix may be performed by, e.g., the DSDA component 198, the application processor 1006, the cellular baseband processor 1024, and/or the transceiver(s) 1022 of the apparatus 1004 in FIG. 10. In some implementations, the calculation of the position of the UE may be associated with cell-ID based positioning.

In another example, the UE may store the set of cache-based fixes in a non-volatile file system of the UE.

In another example, to calculate the position of the UE based on the downloaded data or the selected fix, the UE may provide the downloaded data or the selected fix to a positioning engine associated with the calculation of the position of the UE.

In another example, the first network entity and the second network entity may be associated with different mobile operators.

Figure 9:
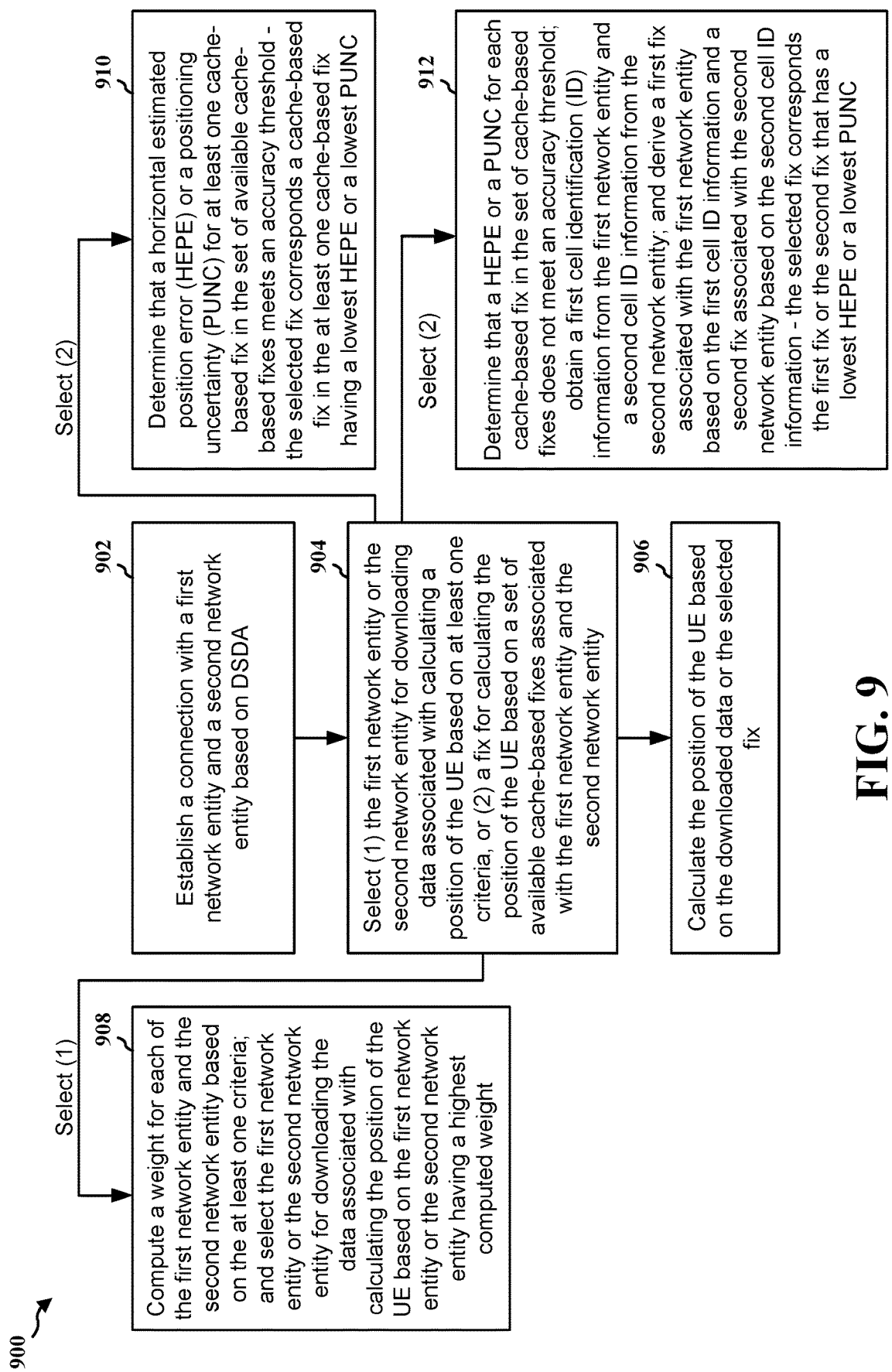
FIG. 9 is a flowchart of a method of wireless communication.

FIG. 9 is a flowchart 900 of a method of wireless communication. The method may be performed by a UE (e.g., the UE 104, 404, 502, 602; the apparatus 1004). The method may enable the UE to improve positioning performance and latency based on DSDA feature(s).

At 902, the UE may establish a connection with a first network entity and a second network entity based on DSDA, such as described in connection with FIGS. 5A, 5B. 5C, and 5D, 6 and 7. For example, as discussed in connection with FIG. 6, the UE 602 may include DSDA capabilities, where the UE 602 may communicate with (and/or monitor communication from) at least a first network/sub (e.g., via a first SIM) and a second network/sub (e.g., via a second SIM) at the same time. The establishment of the connection may be performed by, e.g., the DSDA component 198, the application processor 1006, the cellular baseband processor 1024, and/or the transceiver(s) 1022 of the apparatus 1004 in FIG. 10.

At 904, the UE may select (1) the first network entity or the second network entity for downloading data associated with calculating a position of the UE based on at least one criteria, or (2) a fix for calculating the position of the UE based on a set of available cache-based fixes associated with the first network entity and the second network entity, such as described in connection with FIGS. 6 and 7. For example, at 612 of FIG. 6, the UE 602 may select a network/sub from a plurality of networks/subs for downloading AGPS data based on calculating weightage for the plurality of networks/subs using one or more criteria (e.g., as shown at 610), which may be used for calculating the position of the UE 602. At 706 or 712 of FIG. 7, the UE 602 may also select a best/suitable fix for positioning by comparing the HEPE/PUNC values for a set of fixes. The selection may be performed by, e.g., the DSDA component 198, the application processor 1006, the cellular baseband processor 1024, and/or the transceiver(s) 1022 of the apparatus 1004 in FIG. 10.

In one example, the at least one criteria may include at least one of: an RSRP, a RSRQ, an SNR, a data transmission speed, types of cellular network, an application occupancy, a load of a channel or a cell, or an available bandwidth.

In another example, the data associated with calculating the position of the UE includes at least one of: UTC, IONO information, health information, or satellite information for one or more satellites. In some implementations, the satellite information for the one or more satellites may include at least one of: ephemeris of each satellite in the one or more satellites, almanac of each satellite in the one or more satellites, radial coefficients of each satellite in the one or more satellites, cross track coefficients of each satellite in the one or more satellites, along track coefficients of each satellite in the one or more satellites, or clock bias coefficients of each satellite in the one or more satellites.

At 906, the UE may calculate the position of the UE based on the downloaded data or the selected fix, such as described in connection with FIGS. 6 and 7. For example, at 616 of FIG. 6, based on the AGPS data, the UE 602 may derive a positioning fix, and the UE 602 may provide the derived the derived positioning fix to a positioning engine (e.g., a location engine, or a GNSS engine) that may be configured to determine the position of the UE 602. The calculation of the position of the UE may be performed by, e.g., the DSDA component 198, the application processor 1006, the cellular baseband processor 1024, and/or the transceiver(s) 1022 of the apparatus 1004 in FIG. 10.

In one example, at 908, if the UE selects the first network entity or the second network entity for downloading the data associated with calculating the position of the UE based on the at least one criteria, the UE may compute a weight for each of the first network entity and the second network entity based on the at least one criteria; and select the first network entity or the second network entity for downloading the data associated with calculating the position of the UE based on the first network entity or the second network entity having a highest computed weight, such as described in connection with FIG. 6. For example, at 608, if the UE 602 is specified to download the AGPS data, the UE 602 may be configured to select one of the networks/subs for downloading the AGPS data (e.g., either from the first network/sub or the second network/sub). In one aspect of the present disclosure, to determine which network/sub to select for downloading the AGPS data, the UE 602 may be configured to compute a weight for each network/sub based on one or more parameters. The computation of the weight and the selection of the first network entity or the second network entity for downloading the data may be performed by, e.g., the DSDA component 198, the application processor 1006, the cellular baseband processor 1024, and/or the transceiver(s) 1022 of the apparatus 1004 in FIG. 10. In some implementations, to calculate the position of the UE based on the downloaded data, the UE may derive a second fix based on the downloaded data, and calculate the position of the UE based on the second fix. In some implementations, the calculation of the position of the UE is associated with AGPS service or GNSS assistance service.

In another example, at 910, if the UE selects the fix for calculating the position of the UE based on the set of available cache-based fixes associated with the first network entity and the second network entity, the UE may determine that a HEPE or a PUNC for at least one cache-based fix in the set of available cache-based fixes meets an accuracy threshold, where the selected fix may correspond to a cache-based fix in the at least one cache-based fix having a lowest HEPE or a lowest PUNC, such as described in connection with FIG. 7. For example, at 706, if there is at least one cache-based fix exceeds the predefined accuracy threshold (e.g., the HEPE/PUNC threshold), then the UE 602 may select a cache-based fix from the at least one cache-based fix as the fix for positioning (e.g., as the positioning fix). In one example, if there are multiple cache-based fix exceeding the predefined accuracy threshold, the UE 602 may be configured to select a cache-based fix with the best HEPE/PUNC value. The determination of the HEPE or PUNC for at least one cache-based fix may be performed by, e.g., the DSDA component 198, the application processor 1006, the cellular baseband processor 1024, and/or the transceiver(s) 1022 of the apparatus 1004 in FIG. 10.

In another example, at 912, if the UE selects the fix for calculating the position of the UE based on the set of available cache-based fixes associated with the first network entity and the second network entity, the UE may determine that a HEPE or a PUNC for each cache-based fix in the set of cache-based fixes does not meet an accuracy threshold, obtain a first cell ID information from the first network entity and a second cell ID information from the second network entity, and derive a first fix associated with the first network entity based on the first cell ID information and a second fix associated with the second network entity based on the second cell ID information, where the selected fix corresponds to the first fix or the second fix that has a lowest HEPE or a lowest PUNC, such as described in connection with FIG. 7. For example, if none of the cache-based fixes exceeds the predefined accuracy threshold, at 710, the UE 602 may be configured to download fixes and cell ID (tile) information for both networks/subs based on DSDA. At 712, after obtaining fixes and cell ID (tile) information for both networks/subs based on DSDA, the UE 602 may choose a most suitable or a best fix among the fixes as the positioning fix (e.g., for performing positioning), such as by comparing the HEPE/PUNC values of both fixes derived from the first network/sub and the second network/sub. Similarly, at 708, after the UE 602 selects a fix that can be used as the positioning fix, the UE 602 may provide this positioning fix to the positioning engine that may be configured to determine the position of the UE 602. The determination of the HEPE or PUNC for each cache-based fix, the obtaining of the first cell ID information and the second cell ID information, and/or the derivation of the first fix and the second fix may be performed by, e.g., the DSDA component 198, the application processor 1006, the cellular baseband processor 1024, and/or the transceiver(s) 1022 of the apparatus 1004 in FIG. 10. In some implementations, the calculation of the position of the UE may be associated with cell-ID based positioning.

In another example, the UE may store the set of cache-based fixes in a non-volatile file system of the UE.

In another example, to calculate the position of the UE based on the downloaded data or the selected fix, the UE may provide the downloaded data or the selected fix to a positioning engine associated with the calculation of the position of the UE.

In another example, the first network entity and the second network entity may be associated with different mobile operators.

Figure 10:
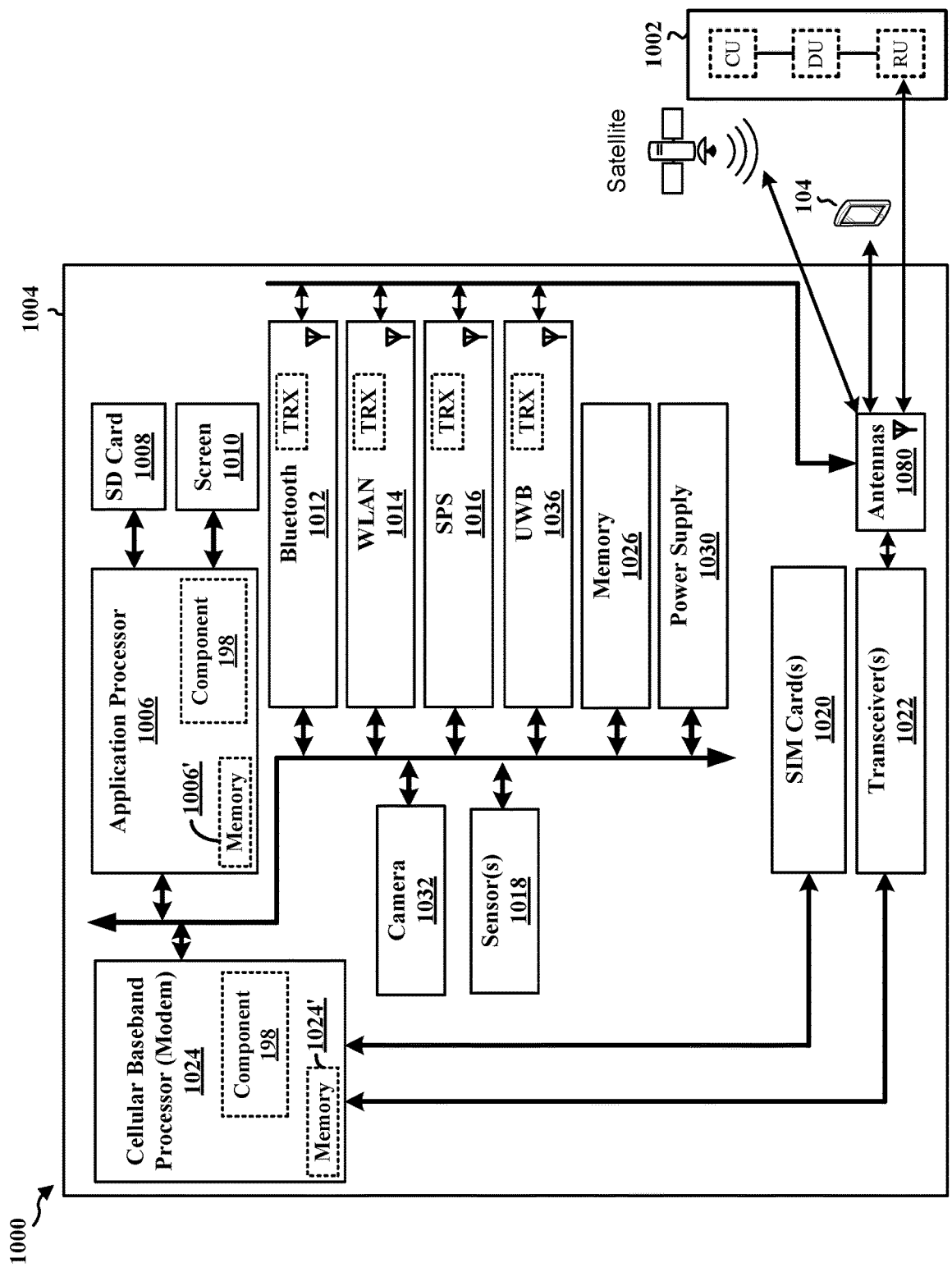
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth® module 1012, a WLAN module 1014, an SPS module 1016 (e.g., GNSS module), an ultra-wideband (UWB) module 1036, one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth® module 1012, the WLAN module 1014, the UWB module 1036, and the SPS module 1016 may include an on-chip transceiver (TRX) (or in some cases, just a receiver (RX)). The Bluetooth® module 1012, the WLAN module 1014, the UWB module 1036, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the UE 350 and may include the memory 360 and/or at least one of the TX processor 368, the RX processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see UE 350 of FIG. 3) and include the additional modules of the apparatus 1004.

As discussed supra, the DSDA component 198 may be configured to establish a connection with a first network entity and a second network entity based on DSDA. The DSDA component 198 may also be configured to select (1) the first network entity or the second network entity for downloading data associated with calculating a position of the UE based on at least one criteria, or (2) a fix for calculating the position of the UE based on a set of available cache-based fixes associated with the first network entity and the second network entity. The DSDA component 198 may also be configured to calculate the position of the UE based on the downloaded data or the selected fix. The DSDA component 198 may be within the cellular baseband processor 1024, the application processor 1006, or both the cellular baseband processor 1024 and the application processor 1006. The DSDA component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, may include means for establishing a connection with a first network entity and a second network entity based on DSDA. The apparatus 1004 may further include means for selecting (1) the first network entity or the second network entity for downloading data associated with calculating a position of the apparatus 1004 based on at least one criteria, or (2) a fix for calculating the position of the apparatus 1004 based on a set of available cache-based fixes associated with the first network entity and the second network entity. The apparatus 1004 may further include means for calculating the position of the apparatus 1004 based on the downloaded data or the selected fix.

In one configuration, the at least one criteria may include at least one of: an RSRP, a RSRQ, an SNR, a data transmission speed, types of cellular network, an application occupancy, a load of a channel or a cell, or an available bandwidth.

In another configuration, the data associated with calculating the position of the apparatus 1004 includes at least one of: UTC, IONO information, health information, or satellite information for one or more satellites. In some implementations, the satellite information for the one or more satellites may include at least one of: ephemeris of each satellite in the one or more satellites, almanac of each satellite in the one or more satellites, radial coefficients of each satellite in the one or more satellites, cross track coefficients of each satellite in the one or more satellites, along track coefficients of each satellite in the one or more satellites, or clock bias coefficients of each satellite in the one or more satellites.

In another configuration, the means for selecting the first network entity or the second network entity for downloading the data associated with calculating the position of the apparatus 1004 based on the at least one criteria may include configuring the apparatus 1004 to compute a weight for each of the first network entity and the second network entity based on the at least one criteria; and select the first network entity or the second network entity for downloading the data associated with calculating the position of the apparatus 1004 based on the first network entity or the second network entity having a highest computed weight. In some implementations, the calculation of the position of the apparatus 1004 is associated with AGPS service or GNSS assistance service.

In another configuration, the means for selecting the first network entity or the second network entity for downloading the data associated with calculating the position of the apparatus 1004 based on the at least one criteria may include configuring the apparatus 1004 to determine that a HEPE or a PUNC for at least one cache-based fix in the set of available cache-based fixes meets an accuracy threshold, where the selected fix may correspond to a cache-based fix in the at least one cache-based fix having a lowest HEPE or a lowest PUNC.

In another configuration, the means for selecting the first network entity or the second network entity for downloading the data associated with calculating the position of the apparatus 1004 based on the at least one criteria may include configuring the apparatus 1004 to determine that a HEPE or a PUNC for each cache-based fix in the set of cache-based fixes does not meet an accuracy threshold, obtain a first cell ID information from the first network entity and a second cell ID information from the second network entity, and derive a first fix associated with the first network entity based on the first cell ID information and a second fix associated with the second network entity based on the second cell ID information, where the selected fix corresponds to the first fix or the second fix that has a lowest HEPE or a lowest PUNC. In some implementations, the calculation of the position of the apparatus 1004 may be associated with cell-ID based positioning.

In another configuration, the apparatus 1004 may further include means for storing the set of cache-based fixes in a non-volatile file system of the apparatus 1004.

In another configuration, the means for calculating the position of the apparatus 1004 based on the downloaded data or the selected fix may include configuring the apparatus 1004 to provide the downloaded data or the selected fix to a positioning engine associated with the calculation of the position of the apparatus 1004.

In another configuration, the first network entity and the second network entity may be associated with different mobile operators.

The means may be the DSDA component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: establishing a connection with a first network entity and a second network entity based on dual subscriber identity module (SIM) dual active (DSDA); selecting (1) the first network entity or the second network entity for downloading data associated with calculating a position of the UE based on at least one criteria, or (2) a fix for calculating the position of the UE based on a set of available cache-based fixes associated with the first network entity and the second network entity; and calculating the position of the UE based on the downloaded data or the selected fix.

Aspect 2 is the method of aspect 1, where selecting the first network entity or the second network entity for downloading the data associated with calculating the position of the UE based on the at least one criteria includes: computing a weight for each of the first network entity and the second network entity based on the at least one criteria; and selecting the first network entity or the second network entity for downloading the data associated with calculating the position of the UE based on the first network entity or the second network entity having a highest computed weight.

Aspect 3 is the method of aspect 1 or 2, where calculating the position of the UE based on the downloaded data includes: deriving a second fix based on the downloaded data; and calculating the position of the UE based on the second fix.

Aspect 4 is the method of any of aspects 1 to 3, where the calculation of the position of the UE is associated with assisted Global Positioning System (AGPS) service or global navigation satellite system (GNSS) assistance service.

Aspect 5 is the method of any of aspects 1 to 4, where the at least one criteria includes at least one of: a reference signal received power (RSRP), a reference signal received quality (RSRQ), a signal-to-noise-ratio (SNR), a data transmission speed, types of cellular network, an application occupancy, a load of a channel or a cell, or an available bandwidth.

Aspect 6 is the method of any of aspects 1 to 5, where the data associated with calculating the position of the UE includes at least one of: Coordinated Universal Time (UTC), ionospheric (IONO) information, health information, or satellite information for one or more satellites.

Aspect 7 is the method of any of aspects 1 to 6, where the satellite information for the one or more satellites includes at least one of: ephemeris of each satellite in the one or more satellites, almanac of each satellite in the one or more satellites, radial coefficients of each satellite in the one or more satellites, cross track coefficients of each satellite in the one or more satellites, along track coefficients of each satellite in the one or more satellites, or clock bias coefficients of each satellite in the one or more satellites.

Aspect 8 is the method of any of aspect 1, where selecting the fix for calculating the position of the UE based on the set of available cache-based fixes associated with the first network entity and the second network entity includes: determining that a horizontal estimated position error (HEPE) or a positioning uncertainty (PUNC) for at least one cache-based fix in the set of available cache-based fixes meets an accuracy threshold, where the selected fix corresponds to a cache-based fix in the at least one cache-based fix having a lowest HEPE or a lowest PUNC.

Aspect 9 is the method of aspect 1, where selecting the fix for calculating the position of the UE based on the set of available cache-based fixes associated with the first network entity and the second network entity includes: determining that a horizontal estimated position error (HEPE) or a positioning uncertainty (PUNC) for each cache-based fix in the set of cache-based fixes does not meet an accuracy threshold; obtaining a first cell identification (ID) information from the first network entity and a second cell ID information from the second network entity; and deriving a first fix associated with the first network entity based on the first cell ID information and a second fix associated with the second network entity based on the second cell ID information, where the selected fix corresponds to the first fix or the second fix that has a lowest HEPE or a lowest PUNC.

Aspect 10 is the method of any of aspects 8 to 9, where the calculation of the position of the UE is associated with cell-ID based positioning.

Aspect 11 is the method of any of aspects 1 to 10, further including: storing the set of cache-based fixes in a non-volatile file system of the UE.

Aspect 12 is the method of any of aspects 1 to 11, where calculating the position of the UE based on the downloaded data or the selected fix includes: providing the downloaded data or the selected fix to a positioning engine associated with the calculation of the position of the UE.

Aspect 13 is the method of aspect 12, where the first network entity and the second network entity are associated with different mobile operators.

Aspect 14 is the method of any of aspects 1 to 13, further including: outputting an indication of the calculated position of the UE.

Aspect 15 is the method of aspect 14, where outputting the indication of the calculated position of the UE includes: transmitting the indication of the calculated position of the UE; or storing the indication of the calculated position of the UE.

Aspect 16 is an apparatus for wireless communication at a user equipment (UE), including: a memory; and at least one processor coupled to the memory and, based at least in part on information stored in the memory, the at least one processor is configured to implement any of aspects 1 to 15.

Aspect 17 is the apparatus of aspect 16, further including at least one of a transceiver or an antenna coupled to the at least one processor.

Aspect 18 is an apparatus for wireless communication including means for implementing any of aspects 1 to 15.

Aspect 19 is a computer-readable medium (e.g., a non-transitory computer-readable medium) storing computer executable code, where the code when executed by a processor causes the processor to implement any of aspects 1 to 15.

What is claimed is:

1. An apparatus for wireless communication at a user equipment (UE), comprising:
at least one memory; and
at least one processor coupled to the at least one memory and, based at least in part on information stored in the memory, the at least one processor is configured to:
establish a connection with a first network entity and a second network entity based on dual subscriber identity module (SIM) dual active (DSDA);
select (1) the first network entity or the second network entity for downloading data associated with calculating a position of the UE based on at least one criteria associated with the first network entity and the second network entity, or (2) a fix for calculating the position of the UE based on a set of available cache-based fixes associated with the first network entity and the second network entity; and
calculate the position of the UE based on the downloaded data or the selected fix.

2. The apparatus of claim 1, wherein to select the first network entity or the second network entity for downloading the data associated with calculating the position of the UE based on the at least one criteria, the at least one processor is configured to:
compute a weight for each of the first network entity and the second network entity based on the at least one criteria; and
select the first network entity or the second network entity for downloading the data associated with calculating the position of the UE based on the first network entity or the second network entity having a highest computed weight.

3. The apparatus of claim 2, wherein to calculate the position of the UE based on the downloaded data, the at least one processor is configured to:
derive a second fix based on the downloaded data; and
calculate the position of the UE based on the second fix.

4. The apparatus of claim 2, wherein the calculation of the position of the UE is associated with assisted Global Positioning System (AGPS) service or global navigation satellite system (GNSS) assistance service.

5. The apparatus of claim 1, wherein the at least one criteria associated with the first network entity and the second network entity includes at least one of:
a reference signal received power (RSRP),
a reference signal received quality (RSRQ),
a signal-to-noise-ratio (SNR),
a data transmission speed, types of cellular network,
an application occupancy,
a load of a channel or a cell, or
an available bandwidth.

6. The apparatus of claim 1, wherein the data associated with calculating the position of the UE includes at least one of:
Coordinated Universal Time (UTC),
ionospheric (IONO) information,
health information, or
satellite information for one or more satellites.

7. The apparatus of claim 6, wherein the satellite information for the one or more satellites includes at least one of:
ephemeris of each satellite in the one or more satellites,
almanac of each satellite in the one or more satellites,
radial coefficients of each satellite in the one or more satellites,
cross track coefficients of each satellite in the one or more satellites,
along track coefficients of each satellite in the one or more satellites, or
clock bias coefficients of each satellite in the one or more satellites.

8. The apparatus of claim 1, wherein to select the fix for calculating the position of the UE based on the set of available cache-based fixes associated with the first network entity and the second network entity, the at least one processor is configured to:
determine that a horizontal estimated position error (HEPE) or a positioning uncertainty (PUNC) for at least one cache-based fix in the set of available cache-based fixes meets an accuracy threshold, wherein the selected fix corresponds to a cache-based fix in the at least one cache-based fix having a lowest HEPE or a lowest PUNC.

9. The apparatus of claim 1, wherein to select the fix for calculating the position of the UE based on the set of available cache-based fixes associated with the first network entity and the second network entity, the at least one processor is configured to:
determine that a horizontal estimated position error (HEPE) or a positioning uncertainty (PUNC) for each cache-based fix in the set of cache-based fixes does not meet an accuracy threshold;
obtain a first cell identification (ID) from the first network entity and a second cell ID from the second network entity; and
derive a first fix associated with the first network entity based on the first cell ID and a second fix associated with the second network entity based on the second cell ID, wherein the selected fix corresponds to the first fix or the second fix that has a lowest HEPE or a lowest PUNC.

10. The apparatus of claim 9, wherein the calculation of the position of the UE is associated with cell-ID based positioning.

11. The apparatus of claim 1, wherein the at least one processor is further configured to:
store the set of cache-based fixes in a non-volatile file system of the UE.

12. The apparatus of claim 1, where to calculate the position of the UE based on the downloaded data or the selected fix, the at least one processor is configured to;
provide the downloaded data or the selected fix to a positioning engine associated with the calculation of the position of the UE.

13. The apparatus of claim 1, wherein the first network entity and the second network entity are associated with different mobile operators.

14. The apparatus of claim 1, wherein the at least one processor is further configured to:
output an indication of the calculated position of the UE.

15. The apparatus of claim 14, further comprising at least one of a transceiver or an antenna coupled to the at least one processor, wherein to output the indication of the calculated position of the UE, the at least one processor is configured to:
transmit, via at least one of the transceiver or the antenna, the indication of the calculated position of the UE; or
store the indication of the calculated position of the UE.

16. A method of wireless communication at a user equipment (UE), comprising:
establishing a connection with a first network entity and a second network entity based on dual subscriber identity module (SIM) dual active (DSDA);
selecting (1) the first network entity or the second network entity for downloading data associated with calculating a position of the UE based on at least one criteria associated with the first network entity and the second network entity, or (2) a fix for calculating the position of the UE based on a set of available cache-based fixes associated with the first network entity and the second network entity; and
calculating the position of the UE based on the downloaded data or the selected fix.

17. The method of claim 16, wherein selecting the first network entity or the second network entity for downloading the data associated with calculating the position of the UE based on the at least one criteria comprises:
computing a weight for each of the first network entity and the second network entity based on the at least one criteria; and
selecting the first network entity or the second network entity for downloading the data associated with calculating the position of the UE based on the first network entity or the second network entity having a highest computed weight.

18. The method of claim 17, wherein calculating the position of the UE based on the downloaded data comprises:
deriving a second fix based on the downloaded data; and
calculating the position of the UE based on the second fix.

19. The method of claim 17, wherein the calculation of the position of the UE is associated with assisted Global Positioning System (AGPS) service or global navigation satellite system (GNSS) assistance service.

20. The method of claim 16, wherein the at least one criteria associated with the first network entity and the second network entity includes at least one of:
a reference signal received power (RSRP),
a reference signal received quality (RSRQ),
a signal-to-noise-ratio (SNR),
a data transmission speed,
types of cellular network,
an application occupancy,
a load of a channel or a cell, or
an available bandwidth.

21. The method of claim 16, wherein the data associated with calculating the position of the UE includes at least one of:
Coordinated Universal Time (UTC),
ionospheric (IONO) information,
health information, or
satellite information for one or more satellites.

22. The method of claim 21, wherein the satellite information for the one or more satellites includes at least one of:
ephemeris of each satellite in the one or more satellites,
almanac of each satellite in the one or more satellites,
radial coefficients of each satellite in the one or more satellites,
cross track coefficients of each satellite in the one or more satellites,
along track coefficients of each satellite in the one or more satellites, or
clock bias coefficients of each satellite in the one or more satellites.

23. The method of claim 16, wherein selecting the fix for calculating the position of the UE based on the set of available cache-based fixes associated with the first network entity and the second network entity comprises:
determining that a horizontal estimated position error (HEPE) or a positioning uncertainty (PUNC) for at least one cache-based fix in the set of available cache-based fixes meets an accuracy threshold, wherein the selected fix corresponds to a cache-based fix in the at least one cache-based fix having a lowest HEPE or a lowest PUNC.

24. The method of claim 16, wherein selecting the fix for calculating the position of the UE based on the set of available cache-based fixes associated with the first network entity and the second network entity comprises:
determining that a horizontal estimated position error (HEPE) or a positioning uncertainty (PUNC) for each cache-based fix in the set of cache-based fixes does not meet an accuracy threshold;
obtaining a first cell identification (ID) from the first network entity and a second cell ID from the second network entity; and
deriving a first fix associated with the first network entity based on the first cell ID and a second fix associated with the second network entity based on the second cell ID, wherein the selected fix corresponds to the first fix or the second fix that has a lowest HEPE or a lowest PUNC.

25. The method of claim 24, wherein the calculation of the position of the UE is associated with cell-ID based positioning.

26. The method of claim 16, further comprising:
storing the set of cache-based fixes in a non-volatile file system of the UE.

27. The method of claim 16, wherein calculating the position of the UE based on the downloaded data or the selected fix comprises:
providing the downloaded data or the selected fix to a positioning engine associated with the calculation of the position of the UE.

28. The method of claim 16, wherein the first network entity and the second network entity are associated with different mobile operators.

29. An apparatus for wireless communication at a user equipment (UE), comprising:
at least one memory; and
at least one processor coupled to the at least one memory, and the at least one processor is configured to:
establish a connection with a first network entity and a second network entity based on dual subscriber identity module (SIM) dual active (DSDA);
select a fix for calculating a position of the UE based on a set of available cache-based fixes associated with the first network entity and the second network entity, wherein selection of the fix is based on the fix in the set of available cache-based fixes having a lowest horizontal estimated position error (HEPE) or a lowest positioning uncertainty (PUNC); and
calculate the position of the UE based on the selected fix.

30. An apparatus for wireless communication at a user equipment (UE), comprising:
at least one memory; and
at least one processor coupled to the at least one memory, and the at least one processor is configured to:
establish a connection with a first network entity and a second network entity based on dual subscriber identity module (SIM) dual active (DSDA);
determine that a horizontal estimated position error (HEPE) or a positioning uncertainty (PUNC) for a set of cache-based fixes associated with the first network entity and the second network entity does not meet an accuracy threshold;
obtain a first cell identification (ID) from the first network entity and a second cell ID from the second network entity;
derive a first fix associated with the first network entity based on the first cell ID and a second fix associated with the second network entity based on the second cell ID;
select the first fix or the second fix for calculating a position of the UE based on the first fix or the second fix that has a lowest HEPE or a lowest PUNC; and
calculate the position of the UE based on the selected first fix or the selected second fix.

* * * * *